United States Patent
Jin et al.

(10) Patent No.: US 11,952,217 B2
(45) Date of Patent: Apr. 9, 2024

(54) ELECTRIC GUIDE RAIL TYPE CONVEYING SYSTEM

(71) Applicant: Hangzhou ZAFFER Intelligent Technology Co.,Ltd., Zhejiang (CN)

(72) Inventors: Justine Jin, Zhejiang (CN); Qi Jin, Zhejiang (CN); Yubin Li, Zhejiang (CN); Bizhang Zhao, Zhejiang (CN)

(73) Assignee: Hangzhou ZAFFER Intelligent Technology Co.,Ltd., Zhejiang (CN)

( * ) Notice: Subject to any disclaimer, the term of this patent is extended or adjusted under 35 U.S.C. 154(b) by 50 days.

(21) Appl. No.: 17/971,642

(22) Filed: Oct. 24, 2022

(65) Prior Publication Data

US 2023/0257204 A1 Aug. 17, 2023

(30) Foreign Application Priority Data

Feb. 11, 2022 (CN) .......................... 202210133670.5

(51) Int. Cl.
*B65G 21/14* (2006.01)
*B65G 54/02* (2006.01)

(52) U.S. Cl.
CPC .................................. *B65G 21/14* (2013.01)

(58) Field of Classification Search
None
See application file for complete search history.

(56) References Cited

U.S. PATENT DOCUMENTS

| 3,673,966 | A | * | 7/1972 | Wilson | B62D 1/265 105/49 |
| 4,279,337 | A | * | 7/1981 | Kachnik | B65G 13/07 104/165 |
| 5,551,552 | A | * | 9/1996 | Ophardt | B05B 13/0221 198/465.1 |
| 9,067,740 | B2 | * | 6/2015 | Kilper | B66F 9/07 |
| 10,494,188 | B2 | * | 12/2019 | Zembutsu | B65G 47/52 |
| 10,549,767 | B2 | * | 2/2020 | Parodi | B61F 5/38 |
| 10,934,099 | B2 | * | 3/2021 | Wireman | B65G 54/02 |
| 11,358,799 | B2 | * | 6/2022 | Buchner | B65G 21/2072 |

* cited by examiner

*Primary Examiner* — Kavel Singh
(74) *Attorney, Agent, or Firm* — JCIPRNET

(57) ABSTRACT

An electric guide rail type conveying system comprises a driving motor, a guide rail, a main transmission case, an auxiliary transmission case, a conveying member, and a moving trolley. Both ends of the conveying member are elastically deformably wound on the first rotating member and the second rotating member of a main transmission case body in two opposite winding direction. Before installation, the conveying member is basically wound on the first rotating member and the second rotating member. When a relative outer portion of the conveying member wound on the first rotating member is separated from the rotating member, a first elastic resilience opposite to one of the two opposite winding direction is generated; with the increase of a portion, separated from the first rotating member, of the conveying member, the first elastic resilience will increase; otherwise, the first elastic resilience will decrease.

10 Claims, 7 Drawing Sheets

ELECTRIC GUIDE RAIL TYPE CONVEYING SYSTEM

CROSS-REFERENCE TO RELATED APPLICATION

This application claims the priority benefit of China application serial no. 202210133670.5, filed on Feb. 11, 2022. The entirety of the above-mentioned patent application is hereby incorporated by reference herein and made a part of this specification.

BACKGROUND

Technical Field

The invention belongs to the technical field of guide rail type conveying equipment, and particularly relates to an electric guide rail type conveying system.

Description of Related Art

Guide rail type conveying equipment comprises a guide rail, a conveyer belt, a motor, and transmission cases disposed at two ends of the guide rail. During operation, the motor drives the conveyer belt to move circularly in an area defined by the transmission cases and the guide rail.

During each installation, the length of the guide rail needs to be adjusted according to specific installation requirements, so the length of the conveyer belt has to be changed according to different lengths of the guide rail in each installation.

To facilitate the installation of the guide rail, guide rails of several preset lengths may be fabricated in the factory, so when installed, different numbers of guide rails of the preset lengths can be connected as needed, and the guide rails do not need to be cut on the site anymore. Obviously, this method is not suitable for conveyer belts.

So, it is necessary to make a further improvement on the transmission cases.

It should be noted that those mentioned above do not all belong to the prior art and are merely used for a better understanding of the invention.

SUMMARY

The objective of the invention is to provide an electric guide rail type conveying system, which makes it possible to simplify the installation steps of a conveying member.

In one example, an electric guide rail type conveying system, comprising:
a driving motor;
a guide rail, a passage which penetrates through the guide rail in a lengthwise direction being disposed in the guide rail, and an opening communicated with the passage being formed in one side of the guide rail in the lengthwise direction;
a main transmission case and an auxiliary transmission case correspondingly disposed at two ends of the guide rail, the driving motor being disposed on the main transmission case;
a conveying member disposed on a structure formed by the main transmission case, the guide rail and the auxiliary transmission case; and
a moving trolley disposed on the conveying member, moving on the guide rail, and used for carrying external goods;

wherein, the auxiliary transmission case comprises:
an auxiliary transmission case body; and
a guide wheel disposed on the auxiliary transmission case body, one portion of the conveying member being movably disposed on the guide wheel during use, and a moving direction of the conveying member being changed by the guide wheel;
wherein, the main transmission case comprises:
a main transmission case body;
a first rotating member rotatably disposed on the main transmission case body, one end of the conveying member being elastically deformably wound on the first rotating member in a first winding direction;
a second rotating member rotatably disposed on the main transmission case body and spaced apart from the first rotating member, an axial direction of the second rotating member being basically parallel with an axial direction of the first rotating member, the other end of the conveying member being elastically deformably wound on the second rotating member in a second winding direction opposite to the first winding direction; and
a balance rotating member rotatably disposed on the main transmission case body and rotatably connected to the first rotating member and the second rotating member, such that when one of the first rotating member and the second rotating member rotates, the other one of the first rotating member and the second rotating member is driven to rotate in a same rotation direction through the balance rotating member;
wherein, before installation, the conveying member is basically wound on the first rotating member and the second rotating member;
wherein, when a relative outer portion of the conveying member wound on the first rotating member is separated from the first rotating member, a first elastic resilience opposite to the first winding direction is generated; with the increase of a portion, separated from the first rotating member, of the conveying member, the first elastic resilience will increase; otherwise, the first elastic resilience will decrease;
wherein, when a relative outer portion of the conveying member wound on the second rotating member is separated from the second rotating member, a second elastic resilience opposite to the second winding direction is generated; with the increase of a portion, separated from the second rotating member, of the conveying member, the second elastic resilience will increase; otherwise, the second elastic resilience will decrease;
wherein, when the driving motor drives the first rotating member to rotate, a portion, not wound on the first rotating member, of the conveying member will be wound on the first rotating member in the first winding direction, a portion, wound on the first rotating member, of the conveying member will be driven by the first rotating member to be tensioned, the relative outer portion, wound on the second rotating member, of the conveying member will be driven by the balance rotating member to be separated from the second rotating member in a direction opposite to the second winding direction, and a portion, wound on the second rotating member, of the conveying member will be driven by the second rotating member to be loosened, such that the second elastic resilience is opposite to the first elastic resilience in direction and is basically identical with the first elastic resilience in magnitude;

wherein, when the driving motor drives the second rotating member to rotate, a portion, not wound on the second rotating member, of the conveying member will be wound on the second rotating member in the second winding direction, a portion, wound on the second rotating member, of the conveying member will be driven by the second rotating member to be tensioned, the relative outer portion, wound on the first rotating member, of the conveying member will be driven by the balance rotating member to be separated from the first rotating member in a direction opposite to the first winding direction, and a portion, wound on the first rotating member, of the conveying member will be driven by the first rotating member to be loosened, such that the first elastic resilience is opposite to the second elastic resilience in direction and is basically identical with the second elastic resilience in magnitude.

Optionally, the first rotating member comprises:
a first rotating shaft; and
a first rotating wheel coaxial with the first rotating shaft, the first rotating shaft and the first rotating wheel rotating synchronously during use;
the second rotating member comprises:
a second rotating shaft; and
a second rotating wheel coaxial with the second rotating shaft, the second rotating shaft and the second rotating wheel rotating synchronously during use.

Optionally, the balance rotating member comprises:
a balance rotating shaft; and
a balance rotating wheel coaxial with the balance rotating shaft, the balance rotating shaft and the balance rotating wheel rotating synchronously during use;
wherein, the first rotating wheel, the second rotating wheel and the balance rotating wheel are all of a gear structure, and the balance rotating wheel is engaged with the second rotating wheel.

Optionally, a shape and size of the first rotating wheel are basically the same as those of the second rotating wheel and those of the balance rotating wheel, and a number, size and shape of wheel teeth of the first rotating wheel are basically the same as those of wheel teeth of the second rotating wheel and those of wheel teeth of the balance rotating wheel.

Optionally, the balance rotating member is a circular conveyer belt or a circular conveyer chain, the first rotating wheel and the second rotating wheel are both of a belt wheel or chain wheel structure, the circular conveyer belt or the circular conveyer chain is installed on the first rotating wheel and the second rotating wheel, and during use, the first rotating wheel or the second rotating wheel rotates to drive the second rotating wheel or the first rotating wheel to rotate in a same direction through the circular conveyer belt or the circular conveyer chain.

Optionally, a height of a first conveying member winding area for storing the conveying member wound on the first rotating member and a height of a second conveying member winding area for storing the conveying member wound on the second rotating member basically match a width of the conveying member.

In other example, an electric guide rail type conveying system, comprising:
a driving motor;
a guide rail, a passage which penetrates through the guide rail in a lengthwise direction being disposed in the guide rail, and an opening communicated with the passage being formed in one side of the guide rail in the lengthwise direction;
a main transmission case and an auxiliary transmission case correspondingly disposed at two ends of the guide rail, the driving motor being disposed on the main transmission case;
a conveying member disposed on a structure formed by the main transmission case, the guide rail and the auxiliary transmission case; and
a moving trolley disposed on the conveying member, moving on the guide rail, and used for carrying external goods;
wherein, the auxiliary transmission case comprises:
an auxiliary transmission case body; and
a guide wheel disposed on the auxiliary transmission case body, one portion of the conveying member being movably disposed on the guide wheel during use, and a moving
wherein, the main transmission case comprises:
a main transmission case body;
a first rotating member rotatably disposed on the main transmission case body, one end of the conveying member being elastically deformably wound on the first rotating member in a winding direction; and
a second rotating member rotatably disposed on the main transmission case body and spaced apart from the first rotating member, an axial direction of the first rotating member being basically parallel to an axial direction of the first rotating member, and the other end of the conveying member being elastically deformably wound on the second rotating member in the winding direction;
wherein, before installation, the conveying member is basically wound on the first rotating member and the second rotating member;
wherein, when a relative outer portion of the conveying member wound on the first rotating member is separated from the first rotating member, a first elastic resilience opposite to the winding direction is generated; with the increase of a portion, separated from the first rotating member, of the conveying member, the first elastic resilience will increase; otherwise, the first elastic resilience will decrease;
wherein, when a relative outer portion of the conveying member wound on the second rotating member is separated from the second rotating member, a second elastic resilience opposite to the winding direction is generated; with the increase of a portion, separated from the second rotating member, of the conveying member, the second elastic resilience will increase; otherwise, the second elastic resilience will decrease;
wherein, the first rotating member comprises:
a first rotating shaft; and
a first rotating wheel coaxial with the first rotating shaft, the first rotating shaft and the first rotating wheel rotating synchronously during use;
wherein, the second rotating member comprises:
a second rotating shaft; and
a second rotating wheel coaxial with the second rotating shaft, the second rotating shaft and the second rotating wheel rotating synchronously during use;
wherein, the first rotating wheel and the second rotating wheel are both of a gear structure, the first rotating wheel is engaged with the second rotating wheel, a size and shape of the first rotating wheel are basically the same as those of the second rotating wheel, and a number, size and shape of wheel teeth of the first rotating wheel are basically the same as those of wheel teeth of the second rotating wheel;

wherein, when the driving motor drives the first rotating member to rotate, a portion, not wound on the first rotating member, of the conveying member will be wound on the first rotating member in the winding direction, a portion, wound on the first rotating member, of the conveying member will be driven by the first rotating member to be tensioned, the relative outer portion, wound on the second rotating member, of the conveying member will be driven by the first rotating member to be separated from the second rotating member in a direction opposite to the winding direction, and a portion, wound on the second rotating member, of the conveying member will be driven by the second rotating member to be loosened, such that the second elastic resilience is opposite to the first elastic resilience in direction and is basically identical with the first elastic resilience in magnitude;

wherein, when the driving motor drives the second rotating member to rotate, a portion, not wound on the second rotating member, of the conveying member will be wound on the second rotating member in the winding direction, a portion, wound on the second rotating member, of the conveying member will be driven by the second rotating member to be tensioned, the relative outer portion, wound on the first rotating member, of the conveying member will be driven by the second rotating member to be separated from the first rotating member in a direction opposite to the winding direction, and a portion, wound on the first rotating member, of the conveying member will be driven by the first rotating member to be loosened, such that the first elastic resilience is opposite to the second elastic resilience in direction and is basically identical with the second elastic resilience in magnitude.

In another example, an electric guide rail type conveying system, comprising:
a driving motor;
a guide rail, a passage which penetrates through the guide rail in a lengthwise direction being disposed in the guide rail, and an opening communicated with the passage being formed in one side of the guide rail in the lengthwise direction;
a main transmission case and an auxiliary transmission case correspondingly disposed at two ends of the guide rail, the driving motor being disposed on the main transmission case;
a conveying member disposed on a structure formed by the main transmission case, the guide rail and the auxiliary transmission case; and
a moving trolley disposed on the conveying member, moving on the guide rail, and used for carrying external goods;
wherein, the auxiliary transmission case comprises:
an auxiliary transmission case body; and
a guide wheel disposed on the auxiliary transmission case body, one portion of the conveying member being movably disposed on the guide wheel during use, and a moving direction of the conveying member being changed by the guide wheel;
wherein, the main transmission case comprises:
a main transmission case body;
a first rotating member rotatably disposed on the main transmission case body, one end of the conveying member being elastically deformably wound on the first rotating member in a winding direction;
a second rotating member rotatably disposed on the main transmission case body and spaced apart from the first rotating member, an axial direction of the first rotating member being basically parallel to an axial direction of the first rotating member, and the other end of the conveying member being elastically deformably wound on the second rotating member in the winding direction; and
a balance rotating member rotatably disposed on the main transmission case body and rotatably connected to the first rotating member and the second rotating member, such that when one of the first rotating member and the second rotating member rotates, the other one of the first rotating member and the second rotating member will be driven to rotate in an opposite direction;
wherein, before installation, the conveying member is basically wound on the first rotating member and the second rotating member;
wherein, when a relative outer portion of the conveying member wound on the first rotating member is separated from the first rotating member, a first elastic resilience opposite to the winding direction is generated; with the increase of a portion, separated from the first rotating member, of the conveying member, the first elastic resilience will increase; otherwise, the first elastic resilience will decrease;
wherein, when a relative outer portion of the conveying member wound on the second rotating member is separated from the second rotating member, a second elastic resilience opposite to the winding direction is generated; with the increase of a portion, separated from the second rotating member, of the conveying member, the second elastic resilience will increase; otherwise, the second elastic resilience will decrease;
wherein, when the driving motor drives the first rotating member to rotate, a portion, not wound on the first rotating member, of the conveying member will be wound on the first rotating member in the winding direction, a portion, wound on the first rotating member, of the conveying member will be driven by the first rotating member to be tensioned, the relative outer portion, wound on the second rotating member, of the conveying member will be driven by the balance rotating member to be separated from the second rotating member in a direction opposite to the winding direction, and a portion, wound on the second rotating member, of the conveying member will be driven by the second rotating member to be loosened, such that the second elastic resilience is opposite to the first elastic resilience in direction and is basically identical with the first elastic resilience in magnitude;
wherein, when the driving motor drives the second rotating member to rotate, a portion, not wound on the second rotating member, of the conveying member will be wound on the second rotating member in the winding direction, a portion, wound on the second rotating member, of the conveying member will be driven by the second rotating member to be tensioned, the relative outer portion, wound on the first rotating member, of the conveying member is driven by the balance rotating member to be separated from the first rotating member in the direction opposite to the winding direction, and a portion, wound on the first rotating member, of the conveying member will be driven by the first rotating member to be loosened, such that the first elastic resilience is opposite to the second elastic resilience in direction and is basically identical with the second elastic resilience in magnitude.

Optionally, wherein, the first rotating member comprises:

a first rotating shaft; and
a first rotating wheel coaxial with the first rotating shaft, the first rotating shaft and the first rotating wheel rotating synchronously during use;
wherein, the second rotating member comprises:
a second rotating shaft; and
a second rotating wheel coaxial with the second rotating shaft, the second rotating shaft and the second rotating wheel rotating synchronously during use;
wherein, one of the first rotating wheel and the second rotating wheel is of a gear structure, and the other one of the first rotating wheel and the second rotating wheel is of a belt wheel or chain wheel structure;
wherein, the balance rotating member comprises:
a balance rotating shaft;
at least two balance rotating wheels coaxial with the balance rotating shaft, the balance rotating shaft and the balance rotating wheels rotating synchronously during use, the at least two said balance rotating wheels being sequentially and coaxially arranged in an axial direction of the balance rotating shaft and being parallel to and spaced apart from each other, at least one of the balance rotating wheels being of a gear structure, and at least the other one of the balance rotating wheels being of a belt wheel or chain wheel structure; and
a circular conveyer belt or a circular conveyer chain disposed on either the first rotating wheel or the second rotating wheel of the belt wheel or chain wheel structure, and one said balance rotating wheel of the belt wheel or chain wheel structure;
wherein, either the first rotating wheel or the second rotating wheel of the gear structure is engaged and connected with one said balance rotating wheel of the gear structure;
wherein, when the driving motor drives one of the first rotating member and the second rotating member to rotate, the other one of the first rotating wheel and the second rotating wheel will be driven to rotate reversely through the balance rotating member.

Optionally, a shape and size of either first rotating wheel or the second rotating wheel of the gear structure are basically the same as those of one said balance rotating wheel, and a number, size and shape of wheel teeth of either first rotating wheel or the second rotating wheel of the gear structure are basically the same as those of wheel teeth of one said balance rotating wheel.

The electric guide rail type conveying system of the invention is provided with an elastically deformable conveying member of a windable structure; before leaving the factory, the conveying member is basically wound on a first rotating member and a second rotating member, that is, the conveying member has been preassembled in a main transmission case; and during installation, the conveying member wound on the first rotating member and the second rotating member is partially pulled out to be installed on a guide wheel.

BRIEF DESCRIPTION OF THE DRAWINGS

To more clearly explain the technical solutions of the embodiments of the invention or the prior art, drawings used for describing the embodiments of the invention or the prior art will be briefly introduced below. Obviously, the drawings in the following description merely illustrate some embodiments of the invention, and those ordinarily skilled in the art can obtain other drawings according to the following ones without creative labor.

The figures are merely for an illustrative purpose, and are not drawn in scale. In the figures, identical reference signs are used to represent identical elements. For the sake of brevity, not all components are marked out with reference signs in each figure.

DESCRIPTION OF THE EMBODIMENTS

Figure 1:
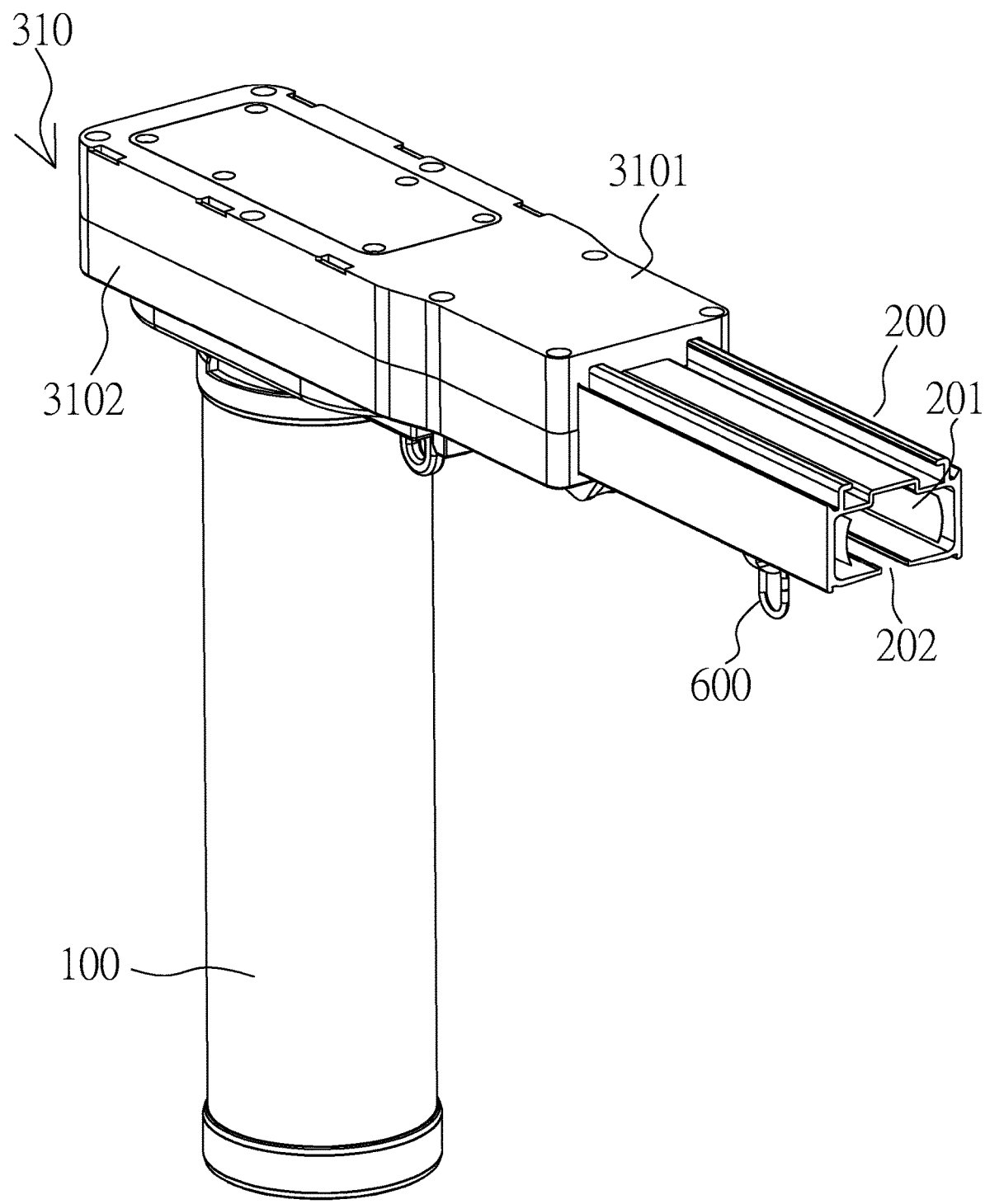
FIG. 1 is a structural view of the combination of a driving motor, a main transmission case and a guide rail according to one implementation of the invention.

The invention will be described below with reference to several examples. It should be understood that the implementations in the following description are merely for those ordinarily skilled in the art to better understand and implement the invention, and do not indicate or imply any limitations to the scope of the invention.

An electric guide rail type conveying system known by those ordinarily skilled in the art before the invention typically comprises a driving motor, a guide rail (one or multiple ones assembled together in turn), a main transmission case, an auxiliary transmission case, a conveying member (which may be, but is not limited to, a conveyer belt or a conveyer chain), and a moving trolley. The guide rail is of a hollow structure, and a passage 201 lengthwise penetrating through the guide rail is disposed in the guide rail. During installation, the main transmission case and the auxiliary transmission case are installed at two ends of the guide rail respectively, the conveying member is connected to a driving wheel located on a main transmission case body in the main transmission case, the passage 201 in the guide rail, and a guide wheel located on an auxiliary transmission case body in the auxiliary transmission case, such that a ring structure is formed. The conveying member of the ring structure has one portion wound on one side of the driving wheel and one portion wound on one side of the guide wheel. During operation, a moving direction of the conveying member will be changed after the conveying member passes through the driving wheel and the guide wheel. In this way, when the driving motor drives the driving wheel, the conveying member of the ring structure will be driven to rotate; and the moving trolley (one or more) for carrying goods is attached to the conveying member of the ring structure, and thus will move forward or backward in a lengthwise direction of the guide rail along with the movement of the conveying member of the ring structure.

Optionally, as shown in FIG. 1-FIG. 4, an opening 202 communicated with the passage 201 may be formed in one side of the guide rail in the lengthwise direction. In this way, one portion of the moving trolley is located in the guide rail, and the other portion (mainly used for carrying goods) of the moving trolley stretches out via the opening 202, which is conducive to the installation of the moving trolley and a hoist 600 (which is disposed in the guide rail, but not bound on the conveying member of the ring structure, and commonly used in an electric curtain system) and unloading of goods on the moving trolley.

One implementation disclosed by the invention is structurally different from the above electric guide rail type conveying system mainly in two aspects: the structure of the conveying member and the structure of the main transmission case. It is because the structure of the conveying member in the invention is different from the structure of the previous conveying member, that the structure the main transmission case in the invention is different from the structure of the previous main transmission case.

Specifically, according to one implementation of the main transmission case disclosed by the invention, the main transmission case comprises a main transmission case body 310, a first rotating member and a second rotating member. The second rotating member is spaced apart from the first rotating member, and an axial direction of the second rotating member is basically parallel to an axial direction of the first rotating member. Wherein, the first rotating member comprises a first rotating shaft 321 and a first rotating wheel 322, the first rotating shaft 321 is rotatably disposed on the main transmission case body 310, the first rotating wheel 322 is coaxial with the first rotating shaft 321, and during use, the first rotating shaft 321 and the first rotating wheel 322 rotate synchronously. Wherein, the second rotating member comprises a second rotating shaft 331 and a second rotating wheel 332, the second rotating shaft 331 is rotatably disposed on the main transmission case body 310, the second rotating wheel 332 is coaxial with the second rotating shaft 331, and during use, the second rotating shaft 331 and the second rotating wheel 332 rotate synchronously.

It should be noted that the first rotating member, the second rotating member, and a rotating shaft and a rotating wheel of a balance rotating member described below may be of an integrated structure or a separated structure, and in the latter case, the rotating shaft may be fixed on the rotating shaft through a connecting piece. In addition, when the radius of the rotating shaft is basically the same as that of the rotating wheel, the rotating shaft can also function as a rotating wheel, that is, the rotating shaft is equivalent to the combination of the rotating shaft and the rotating wheel. In other words, this is a special case of the combination of the rotating shaft and the rotating wheel, and in this case, the rotating member only comprises the rotating shaft. When two matched rotating wheels are both of a belt wheel structure with a smooth circumferential side, the two rotating shafts connected to the two rotating wheels of the belt wheel structure are equivalent to the combination of the rotating shaft and the rotating wheel. In other words, this is another special case of the combination of the rotating shaft and the rotating wheel, and in this case, the rotating member only comprises the rotating shaft.

To facilitate the installation of parts on the main transmission case body 310, as shown in FIG. 1-FIG. 4, in one example, the main transmission case body 310 is of a separated structure, and comprises an upper main transmission case body 3101 and a lower main transmission case body 3102 which are connected through detachable connecting pieces such as screws and/or buckles. In this way, during installation, the upper main transmission case body 3101 and the lower main transmission case body 3102 can be separated first, then corresponding parts, such as the first rotating member and the second rotating member are installed on the upper main transmission case body 3101 and the lower main transmission case body 3102, and then, the upper main transmission case body 3101 and the lower main transmission case body 3102 are combined. From the perspective of fabrication, by designing the main transmission case body 310 having a closed cavity structure therein to be of the separated structure, the closed cavity structure is changed into an open cavity structure, so the structure of a mold used for fabricating the main transmission case body 310 is relatively simple, the probability of deformation of the closed cavity structure during fabrication is relatively low, and the yield is high.

Figure 2:
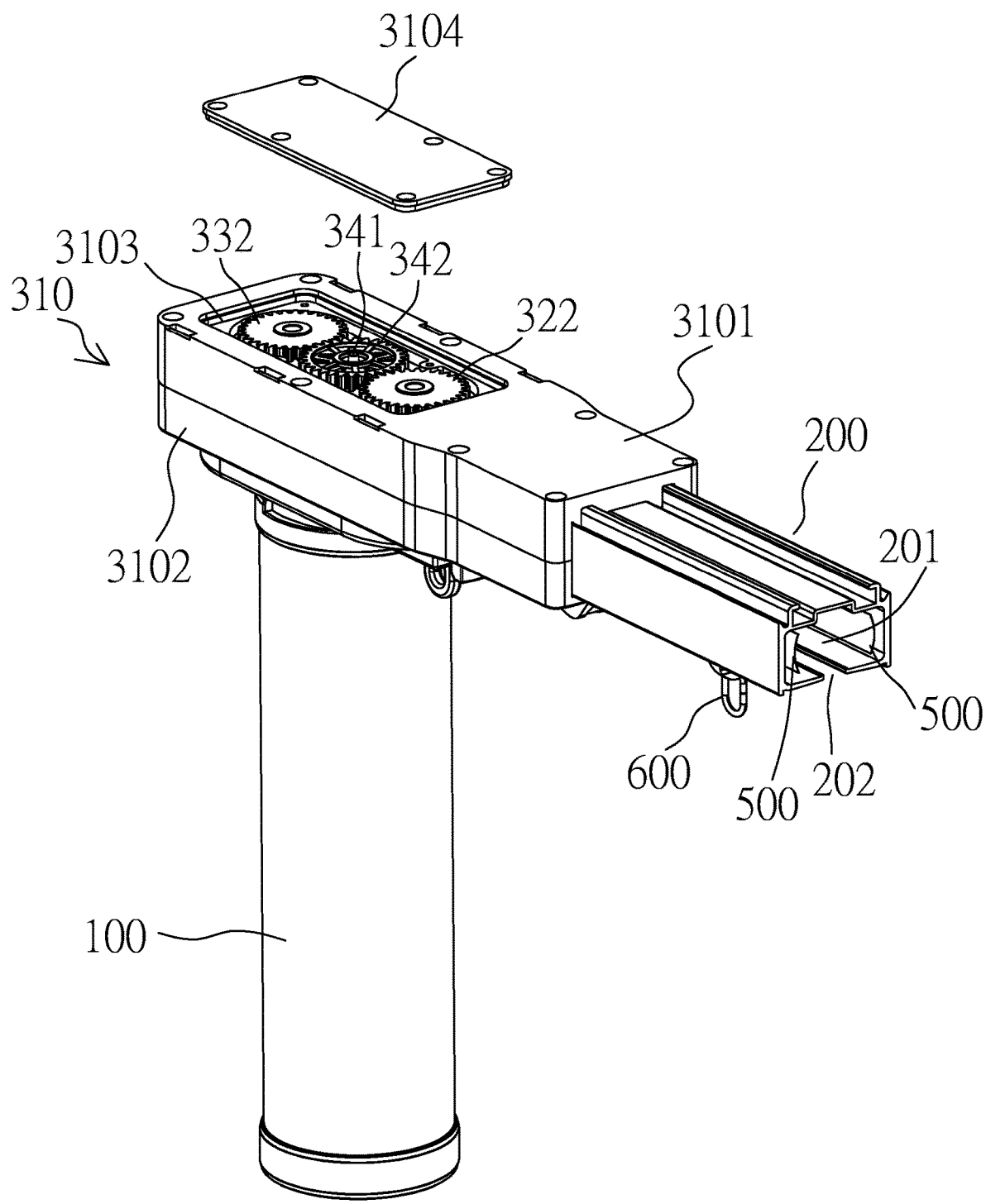
FIG. 2 is a structural view of FIG. 1 when a cover for an opening of a rotating member mounting groove is opened.

To facilitate the installation and maintenance of the first rotating member, the second rotating member, and the balance rotating member described below, a rotating member mounting groove 3103 is formed in one side (a large side such as the front side or the back side) of the main transmission case body 310, and all or most of the first rotating member, the second rotating member and the balance rotating member described below are disposed in the rotating member mounting groove 3103, an opening of the rotating member mounting groove 3103 faces outwards, a cover 3104 for the opening of the rotating member mounting groove is connected to the periphery of the opening of the rotating member mounting groove 3103 in the main transmission case body 310 through detachable connecting pieces such as screws and/or buckles. In the case where the main transmission case body 310 is of the separated structure, the rotating member mounting groove 3103 may be formed in one of the upper main transmission case body 3101 and the lower main transmission case body 3102. As shown in FIG. 2, the rotating member mounting groove 3103 is formed in the upper main transmission case body 3101.

Specifically, according to one implementation the conveying member disclosed by the invention, two ends of the conveying member are separated rather than being combined together to form a ring structure. One end of the conveying member 500 is elastically deformably wound on the first rotating member in a winding direction (a clockwise direction or an anticlockwise direction), and the other end of the conveying member 500 is elastically deformably wound on the second rotating member in the winding direction (that is, the two ends of the conveying member 500 are wound on the first rotating member and the second rotating member in the same direction). The first rotating wheel 322 and the second rotating wheel 332 are both of a gear structure and are engaged with each other, the size and shape of the first rotating wheel 322 are basically the same as those of the second rotating wheel 332, and the number, size and shape of wheel teeth of the first rotating wheel 322 are basically the same as those of wheel teeth of the second rotating wheel 332.

In this way, the conveying member 500 can be preassembled on the main transmission case body in the factory, that is, the conveying member 500 is basically wound on the first rotating member and the second rotating member; and during installation, the conveying member 500 wound on the first rotating member and the second rotating member is pulled out and is then wound on one side of the guide wheel located on the auxiliary transmission case body in the auxiliary transmission case. Because the conveying member 500 is wound on the first rotating member and the second rotating member, the conveying member 500 occupies a little internal space of the main transmission case body, which make it possible to preassemble the conveying member 500 on the main transmission case body. In addition, the conveying member 500 wound on the first rotating member and the second rotating member can be long enough to adapt to guide rails of different lengths when installed.

It should be noted that, according to one implementation of the conveying member disclosed by the invention, the material of the conveying member is different from that of previously-mentioned conveying member of the ring structure because the shape change generated when the conveying member is wound on the first rotating member and the second rotating member should be an elastic deformation as required by this implementation. For example, the conveying member may be a belt structure made of steel. The width of the conveying member ranges from 0.2 cm to 10 cm, and is generally less than 1 cm (such as 0.4 cm, 0.5 cm, or 0.6 cm) (when the weight of goods carried by the conveying member is low, such as less than 1 kg, or no more than 10 kg); and when the weight of goods carried by the conveying member is large, the width of the conveying member may be over 1 cm. In addition, for the sake of easy winding, the thickness of the conveying member should be on the millimeter level (such as 0.5 mm, 1 mm, or 1.5 mm), and should not be over 2 mm at most. The conveying member is a belt structure, has two elastically deformable ends in a rolled-up state, and will not generate plastic deformation. As one specific implementation, any one of the two ends of the conveying member is a coil spring, the specific structure of which may be the same as that of a steel measure tape or may be in other forms. In this way, when a relative outer portion of the conveying member 500 wound on the first rotating shaft 321 of the first rotating member is separated from the first rotating member, a first elastic resilience opposite to the winding direction is generated; with the increase of the portion, separated from the first rotating member, of the conveying member 500, the first elastic resilience will increase; otherwise, the first elastic resilience will decrease. When a relative outer portion of the conveying member 500 wound on the second rotating shaft 331 of the second rotating member is separated from the first rotating member, a second elastic resilience opposite to the winding direction is generated; with the increase of the portion, separated from the second rotating member, of the conveying member 500, the second elastic resilience will increase, otherwise, the second elastic resilience will decrease.

In addition, it should be noted that, in one implementation of the conveying member disclosed by the invention, a portion, which is neither wound on the first rotating member nor wound on the second rotating member (even during operation), of the conveying member may be made of materials that cannot be elastically deformed, such as engineering plastic.

Because the first rotating wheel 322 and the second rotating wheel 332 are engaged and connected with each other and rotate in opposite directions during operation and the conveying member 500 is wound on the first rotating shaft 321 of the first rotating member and on the second rotating shaft 331 of the second rotating member in the same direction, when the driving motor 100 drives the first rotating shaft 321 of the first rotating member to rotate, the portion, not wound on the first rotating member, of the conveying member 500 will be wound on the first rotating member in the winding direction, the portion, wound on the first rotating member, of the conveying member 500 will be driven by the first rotating member to be tensioned, the relative outer portion, wound on the second rotating member, of the conveying member 500 will be driven by the first rotating member to be separated from the second rotating member in a direction opposite to the winding direction, and the portion, wound on the second rotating member, of the conveying member 500 will be driven by the second rotating member to be loosened, such that the second elastic resilience is opposite to the first resilience in direction and is basically identical with the first resilience in magnitude. When the driving motor 100 drives the second rotating member to rotate, the portion, not wound on the second rotating member, of the conveying member 500 will be wound on the second rotating member in the winding direction, the portion, wound on the second rotating member, of the conveying member 500 will be driven by the second rotating member to be tensioned, the relative outer portion, wound on the first rotating member, of the conveying member 500 will be driven by the second rotating member to be separated from the first rotating member in a direction opposite to the winding direction, and the portion, wound on the first rotating member, of the conveying member 500 will be driven by the first rotating member to be loosened, such that the first elastic resilience is opposite to the second elastic resilience in direction and is basically identical with the second elastic resilience in magnitude.

To ensure that the conveying member 500 wound on the first rotating member and the second rotating member can generate a large elastic resilience when pulled to be separated from the first rotating member and the second rotating member and the direction of the elastic resilience is basically in parallel with the direction of the conveying member 500, in one example, the height of a first conveying member winding area 323 for storing the conveying member 500 wound on the first rotating member and the height of a second conveying member winding area 333 for storing the conveying member 500 wound on the second rotating member basically match the width of the conveying member 500.

Figure 3:
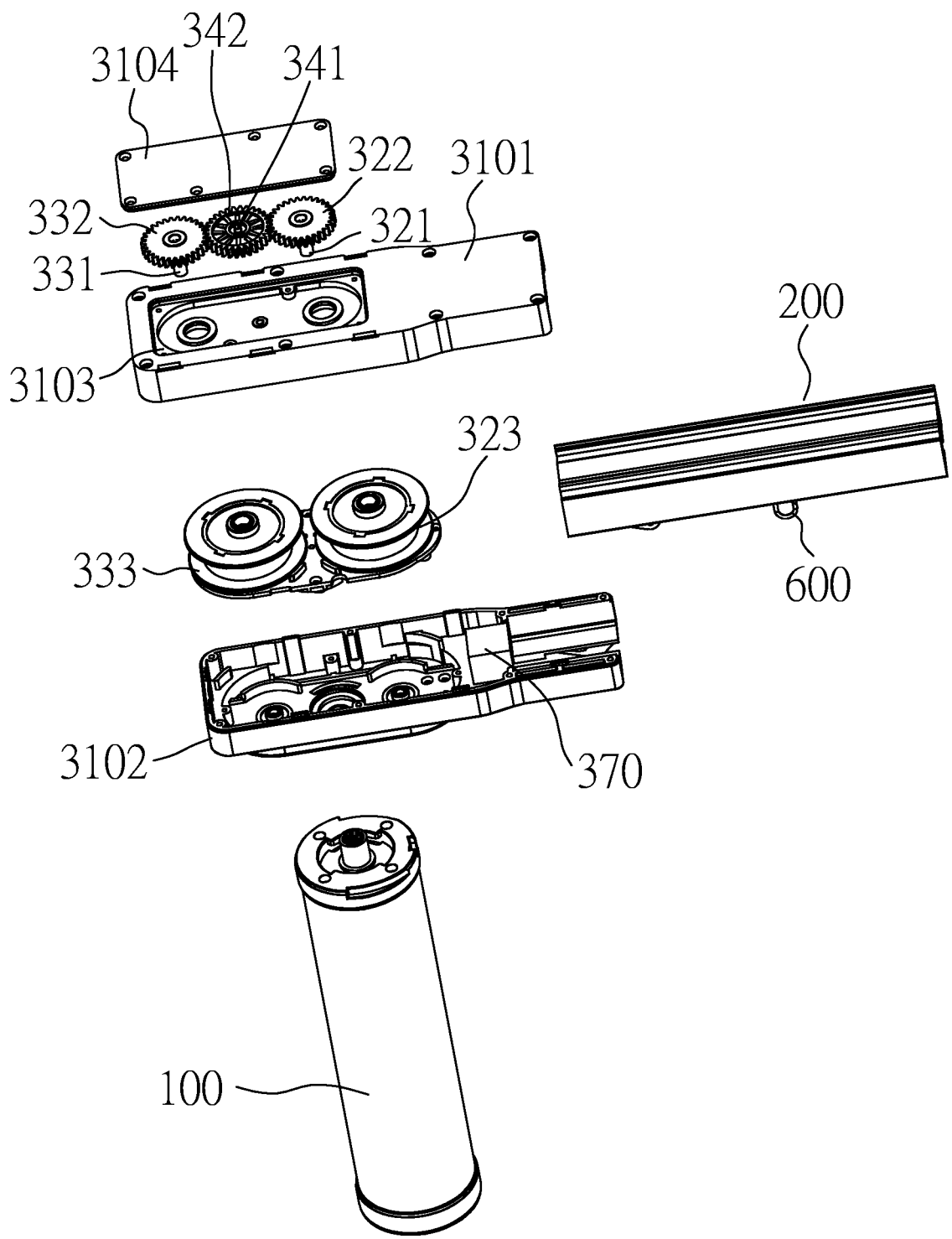
FIG. 3 is an exploded structural view of FIG. 1 from one perspective.

To prevent the conveying member 500 against contact with the main transmission case body 310 after the conveying member 500 enters the main transmission case body 310, as one example, a conveying spacer 370 is disposed at an opening, adjacent to the guide rail 200, of the main transmission case body 310 to isolate the conveying member 500 when the conveying member 500 enters or comes out of the main transmission case body 310. One conveying spacer 370 may be disposed at the opening of the main transmission case body 310. For example, as shown in FIG. 3, the conveying spacer 370 is a stop block convexly disposed in the main transmission case body 310, such that two conveying member passages spaced apart from each other are formed between two horizontal sides of the conveying spacer 370 and the inner wall of the main transmission case body 310, and the two ends of the conveying member 500 enter and come out of the main transmission case body 310 through the two conveying member passages respectively. Multiple conveying spacers 370 may be disposed at the opening of the main transmission case body 310. For example, the conveying spacers 370 are two rows of stop pillars, each row of stop pillars are arranged in a same direction as the conveying member 500 entering or coming out of the main transmission case body 310, one end of the conveying member 500 is disposed on one row of stop pillars in a crossed manner, and the other end of the conveying member 500 is disposed on the other row of stop pillars in a crossed manner. The conveying spacer 370 may also be other structures.

According to another implementation of the main transmission case disclosed by the invention, the main transmission case comprises a main transmission case body 310, a first rotating member, a second rotating member and a balance rotating member. The first rotating member comprises a first rotating shaft 321 and a first rotating wheel 322, the first rotating shaft 321 is rotatably disposed on the main transmission case body 310, the first rotating wheel 322 is coaxial with the first rotating shaft 321, and during use, the first rotating shaft 321 and the first rotating wheel 322 rotate synchronously. The second rotating member comprises a second rotating shaft 331 and a second rotating wheel 332, the second rotating shaft 331 is rotatably disposed on the main transmission case body 310, the second rotating wheel 332 is coaxial with the second rotating shaft 331, and during use, the second rotating shaft 331 and the second rotating wheel 332 rotate synchronously.

The balance rotating member is connected to the first rotating member and the second rotating member. During operation, one of the first rotating member and the second rotating member drives the other one of the first rotating member and the second rotating member to rotate through the balance rotating member, so as to dynamically balance the first elastic resilience and the second elastic resilience. The balance rotating member may be of different structures, depending on whether the winding direction of the conveying member on the first rotating member is identical with the winding direction of the conveying member on the second rotating member, which will be specifically described below.

In one example, when one end of the conveying member 500 is elastically deformably wound on the first rotating member in a first winding direction and the other end of the conveying member 500 is elastically deformably wound on the second rotating member in a second winding direction opposite to the first winding direction, as one optional structure of the balance rotating member, the balance rotating member comprises a balance rotating shaft 341 and a balance rotating wheel 342, wherein the balance rotating wheel 342 is coaxial with the balance rotating shaft 341, and during use, the balance rotating shaft 341 and the balance rotating wheel 342 rotate synchronously. In addition, the first rotating wheel 322, the second rotating wheel 332 and the balance rotating wheels 342 are all of a gear structure, and the balance rotating wheel 342 is engaged with the first rotating wheel 322 and the second rotating wheel 332.

During operation, when one of the first rotating member and the second rotating member rotates, the other one of the first rotating member and the second rotating member will be driven to rotate in the same rotation direction through the balance rotating member. Specifically, when the driving motor 100 drives the first rotating member to rotate, a portion, not wound on the first rotating member, of the conveying member 500 will be wound the first rotating member in the first winding direction, a portion, wound on the first rotating member, of the conveying member 500 will be driven by the first rotating member to be tensioned, a relative outer portion, wound on the second rotating member, of the conveying member 500 will be driven by the balance rotating member to be separated from the second rotating member in a direction opposite to the second winding direction, and a portion, wound on the second rotating member, of the conveying member 500 will be driven by the second rotating member to be loosened, such that the second elastic resilience is opposite to the first elastic resilience and is basically identical with the first elastic resilience in magnitude. When the driving motor 100 drives the second rotating member to rotate, a portion, not wound on the second rotating member, of the conveying member 500 will be wound on the second rotating member in the second winding direction, a portion, wound on the second rotating member, of the conveying member 500 will be driven by the second rotating member to be tensioned, a relative outer portion, wound on the first rotating member, of the conveying member 500 will be driven by the balance rotating member to be separated from the first rotating member in a direction opposite to the first winding direction, and a portion, wound on the first rotating member, of the conveying member 500 will be driven by the first rotating member to be loosened, such that the first elastic resilience is opposite to the second elastic resilience in direction and is basically identical with the second elastic resilience in magnitude.

Figure 4:
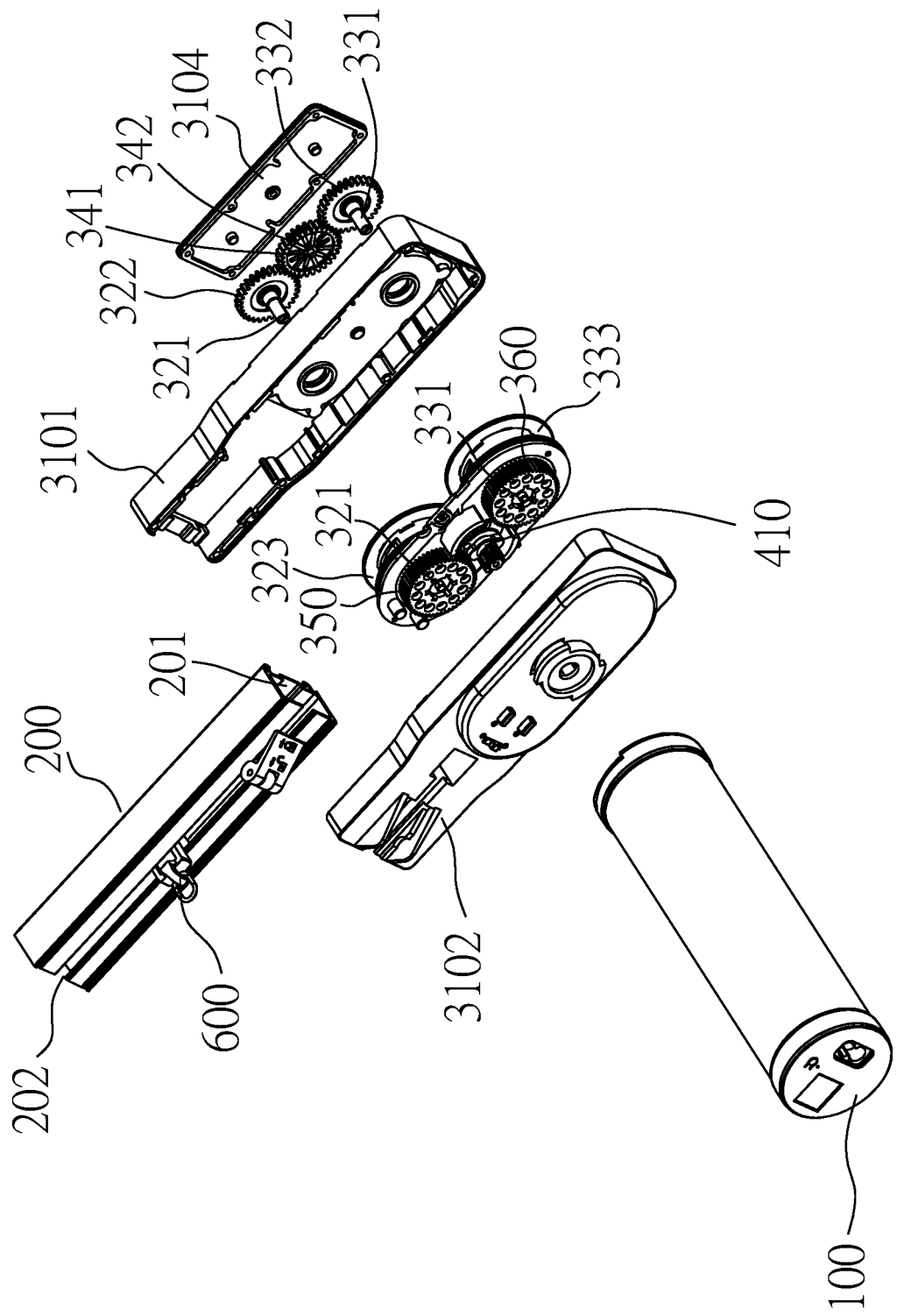
FIG. 4 is an exploded structural view of FIG. 1 from another perspective.

As shown in FIG. 2-FIG. 4, to more effectively transfer the torque of the balance rotating wheel 342, in one example, the shape and size of the first rotating wheel 322 on the first rotating member are basically the same as those of the second rotating wheel 332 on the second rotating member and those of the balance rotating wheel 342 on the balance rotating member, and the number, size and shape of wheel teeth of the first rotating wheel 322 are basically the same as those of wheel teeth of the second rotating wheel 332 and those of wheel teeth of the balance rotating wheel 342.

Considering the installation space in the main transmission case body 310, the radius of the balance rotating wheel 342 may be smaller than that of the first rotating wheel 322 and the second rotating wheel 332. For example, the radius of the balance rotating wheel 342 may be ¼ to ½ that of the first rotating wheel 322 and the second rotating wheel 332. Or, the balance rotating wheel 342 may be disposed on a vertical line segment perpendicular to the line segment connecting the center of the first rotating wheel 322 and the center of the second rotating wheel 332 rather than being disposed on the line segment connecting the center of the first rotating wheel 322 and the center of the second rotating wheel 332, and is away from the interaction of the two line segments along the vertical line segment. For example, the distance from the center of the balance rotating wheel 342 to the interaction may be greater than the radius of the first rotating wheel 322 and the radius the second rotating wheel 332, and the balance rotating wheel 342 is connected to the first rotating wheel 322 and the second rotating wheel 332, such that the spatial structure in an existing main transmission case body does not need to be changed anymore.

In one example, when one end of the conveying member 500 is elastically deformably wound on the first rotating member in a first winding direction and the other end of the conveying member 500 is elastically deformably wound on the second rotating member in a second winding direction opposite to the first rotating direction, as another structure of the balance rotating member, the balance rotating member is a circular conveyer belt or a circular conveyer chain, the first rotating wheel 322 and the second rotating wheel 332 are both of a belt wheel or chain wheel structure, the circular conveyer belt or the circular conveyer chain is installed on the first rotating wheel 322 and the second rotating wheel 332, and during use, the first rotating wheel 322 or the second rotating wheel 332 drives the second rotating wheel 332 or the first rotating wheel 322 to rotate in the same direction through the circular conveyer belt or the circular conveyer chain. The operating principle of the system in this example is the same as the operating principle of the system comprising the balance rotating member of the above-mentioned optimal structure.

In one example, when one end of the conveying member 500 is elastically deformably wound on the first rotating member in a winding direction and the other end of the conveying member 500 is elastically deformably wound on the second rotating member in the same winding direction, as another structure of the balance rotating member, the balance rotating member comprises a balance rotating shaft 341, balance rotating wheels 342, and a circular conveyer belt or a circular conveyer chain, wherein the balance rotating wheels 342 are coaxial with the balance rotating shaft 341, the balance rotating wheels 342 and the balance rotating shaft 341 rotate synchronously during use, at least two balance rotating wheels 342 are sequentially and coaxially arranged in an axial direction of the balance rotating shaft 341 and are parallel with and spaced apart from each other, at least one of the balance rotating wheels 342 is of a gear structure, and at least the other one of the balance rotating wheels 342 is of a belt wheel or chain wheel structure. The circular conveyer belt or the circular conveyer chain is disposed on either the first rotating wheel 322 or the second rotating wheel 332 of the belt wheel or chain wheel structure, and one balance rotating wheel 342 of the belt wheel or chain wheel structure. Either the first rotating wheel 322 or the second rotating wheel 332 of the gear structure is engaged and connected with one balance rotating wheel 342 of the gear structure. When the driving motor 100 drives one of the first rotating member and the second rotating member to rotate, the other one of the first rotating wheel 322 and the second rotating wheel 332 will be driven to rotate reversely through the balance rotating member.

During operation, when the driving motor 100 drives the first rotating member to rotate, a portion, not wound on the first rotating member, of the conveying member 500 will be wound on the first rotating member in the winding direction, a portion, wound on the first rotating member, of the conveying member 500 will be driven by the first rotating member to be tensioned, a relative outer portion, wound on the second rotating member, of the conveying member 500 will be driven by the balance rotating member to be separated from the second rotating member in a direction opposite to the winding direction, and a portion, wound on the second rotating member, of the conveying member 500 will be driven by the second rotating member to be loosened, such that the second elastic resilience is opposite to the first elastic resilience in direction and is basically identical with the first elastic resilience in magnitude. When the driving motor 100 drives the second rotating member to rotate, a portion, not wound on the second rotating member, of the conveying member 500 will be wound on the second rotating member in the winding direction, a portion, wound on the second rotating member, of the conveying member 500 will be driven by the second rotating member to be tensioned, a relative outer portion, wound on the first rotating member, of the conveying member 500 will be driven by the balance rotating member to be separated from the first rotating member in a direction opposite to the winding direction, and a portion, wound on the first rotating member, of the conveying member 500 will be driven by the first rotating member to be loosened, such that the first elastic resilience is opposite to the second elastic resilience in direction and is basically identical with the first elastic resilience in magnitude.

As shown in FIG. 2 to FIG. 4, in order to more effectively transfer the torque of the balance rotating wheel 342, in one example, the shape and size of the first rotating wheel 322 on the first rotating member are basically the same as those of the second rotating wheel 332 on the second rotating member and those of the balance rotating wheel 342 on the balance rotating member, and the number, size and shape of wheel teeth of the first rotating wheel 322 are basically the same as those of wheel teeth of the second rotating wheel 332 and those of wheel teeth of the balance rotating wheel 342.

As for the driving motor 100, it should be noted that, because the first rotating member and the second rotating member are disposed on the main transmission case 300, the driving motor 100 should be able to drive one of the first rotating member and the second rotating member to rotate during operation, so two driving motors 100 may be configured, one of which controls the rotation of the first rotating member, and the other one controls the rotation of the second rotating member. In addition to this scheme, the first rotating member and the second rotating member may be controlled by one driving motor 100 through the following clutch device.

Figure 5:
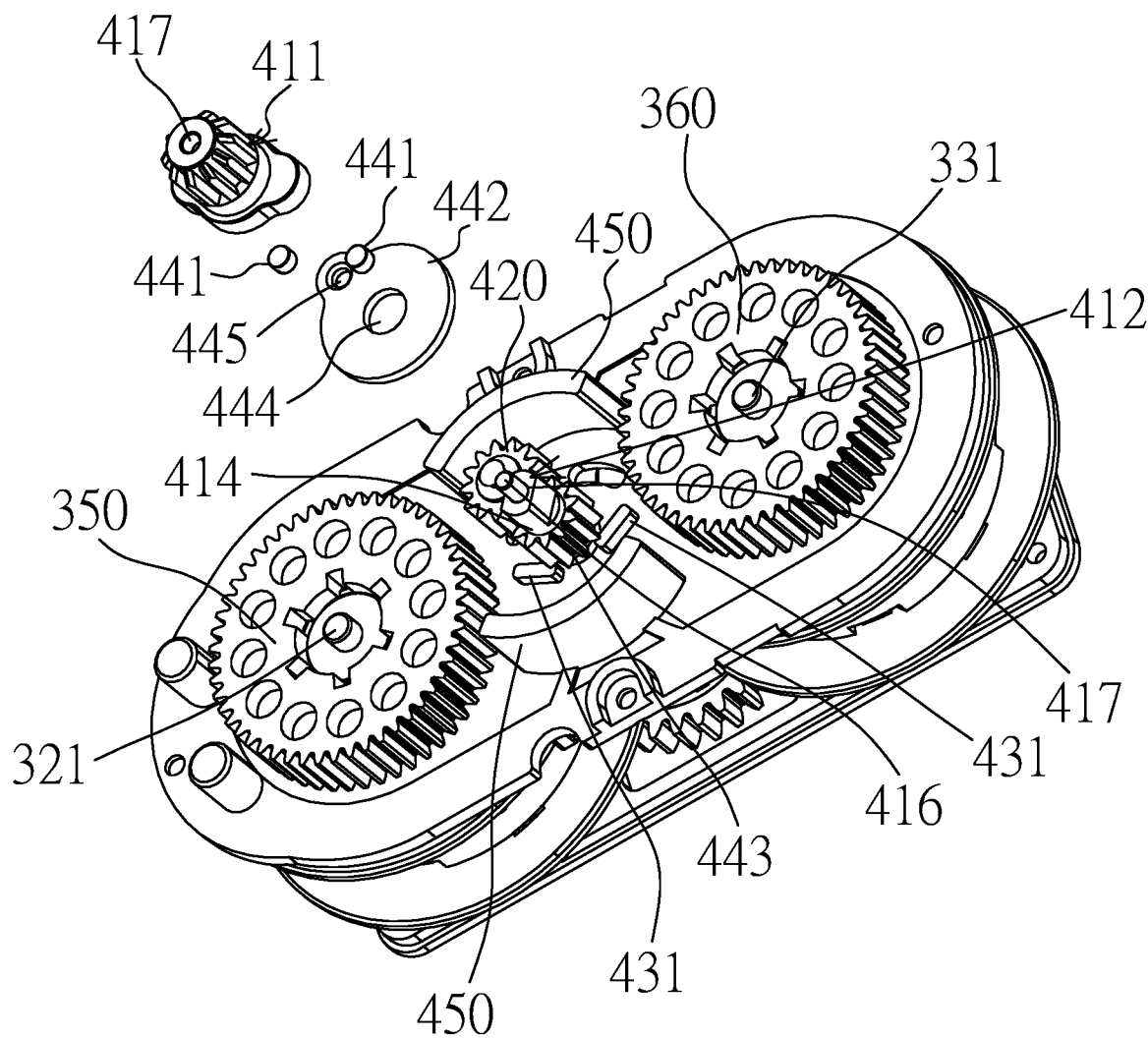
FIG. 5 is a structural view of most parts installed on a main transmission case body in FIG. 1.
Figure 7:
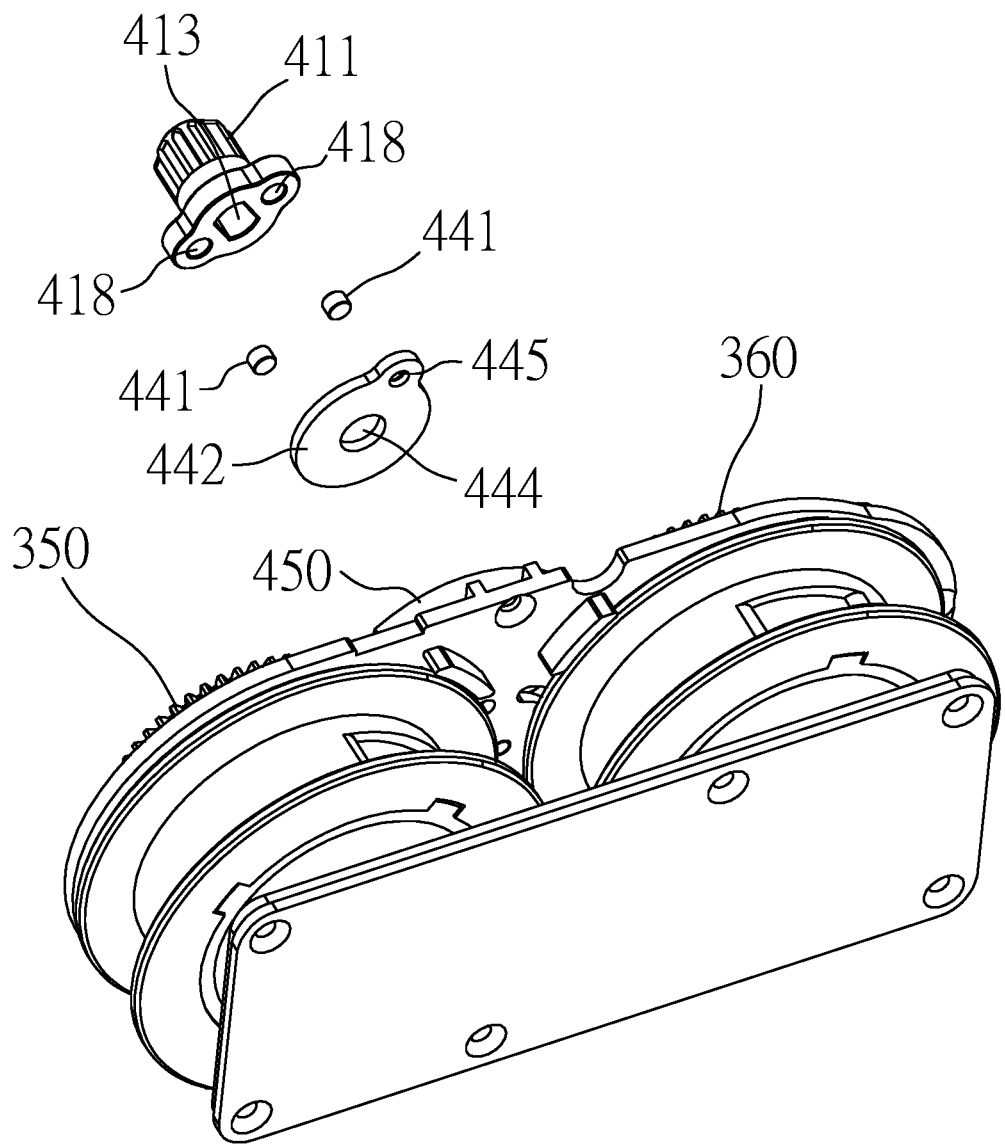
FIG. 7 is a structural view of FIG. 5 from another perspective.

As shown in FIG. 5 and FIG. 7, according to one implementation of the clutch device, the clutch device comprises a main driving member 410, an intermediate driving member 420, a swing assembly, and a pair of stoppers. During use, the clutch device is connected to one of a first driven member 350 and a second driven member 360 which are arranged in parallel and are spaced apart from each other. The first driven member 350 is coaxially disposed on the first rotating member (as show in FIG. 5 and FIG. 7, the first driven member 350 is fixed on the first rotating shaft 321), and rotates synchronously with the first rotating member during operation. The second driven member 360 is coaxially disposed on the second rotating member (as shown in FIG. 5 and FIG. 7, the second driven member 360 is fixed on the second rotating shaft 331), and rotates synchronously with the second rotating member during operation. The main driving member 410 is connected to the driving motor 100. In this way, when operating, the driving motor 100 drives the first driven member 350 or the second driven member 360 to rotate through the clutch device connected to the first driven member 350 or the second driven member 360.

It should be noted that the connection manner of the main driving member 410 and the intermediate driving member 420, the connection manner of the intermediate driving member 420 and the first driven member 350, and the connection manner of the intermediate driving member 420 and the second driven member 360 may be identical or different. Specifically, the main driving member 410 and the intermediate driving member 420, the intermediate driving member 420 and the first driven member 350, and the intermediate driving member 420 and the second driven member 360 may be connected through a conveyer belt or a conveyer chain, or through engagement of teeth, as long as the main driving member 410 can directly or indirectly drive the intermediate driving member 420 to rotate when rotating, and the intermediate driving member 420 can directly or indirectly drive the first driven member 350 or the second driven member 360 connected to the intermediate driving member 420 to rotate when rotating.

As a specific implementation of the main driving member 410 and the intermediate driving member 420, synchronous wheels are coaxially disposed on the main driving member 410 and the intermediate driving member 420 respectively, and a plurality of engaged teeth are disposed on the outer circumferences of the synchronous wheels (namely a gear is formed). During use, the rotating main driving member 410 (in case of an integrated structure) or a rotating main driving outer sub-part 411 (in case of a separable structure) is engaged and connected with a gear on the intermediate driving member 420 through a gear on the main driving member 410 or the main driving outer sub-part 411. Preferably, the shape and size of teeth of the gear on the main driving member 410 and the distance between the adjacent teeth of the gear on the main driving member 410 are basically the same as the shape and size of teeth of the gear on the intermediate driving member 420 and the distance between the adjacent teeth of the gear on the intermediate driving member 420.

Figure 6:
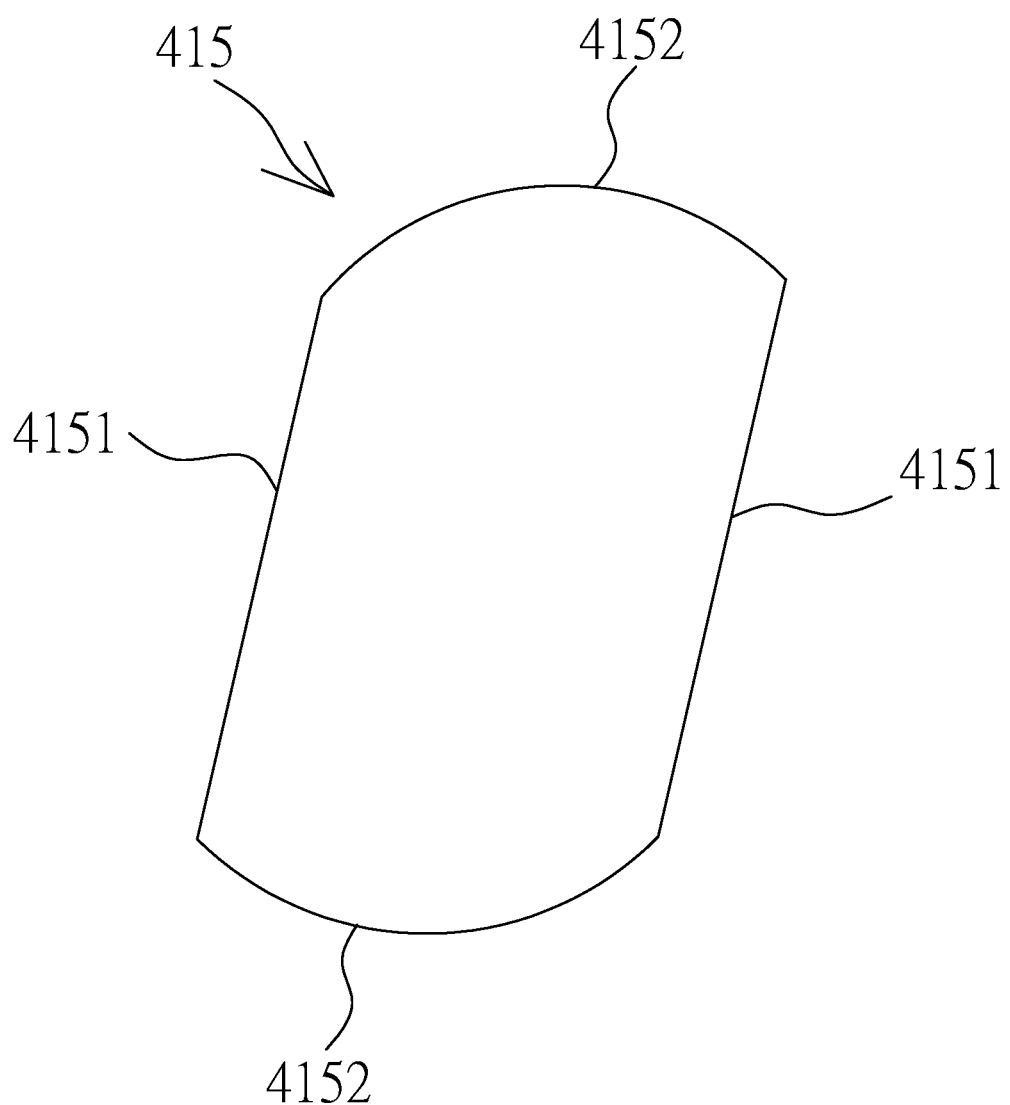
FIG. 6 is a plan view of the cross-section of an inner sub-part insert of a clutch device in FIG. 5.

It should be noted that the main driving member 410 may be of an integrated structure, or is formed by multiple separable structures. As one example of the separable main driving member 410, as shown in FIG. 5 and FIG. 7, the main driving member 410 comprises the main driving outer sub-part 411 and a main driving inner sub-part 412 inserted in and connected to the main driving outer sub-part 411. One end of the main driving outer sub-part 411 is directly or indirectly connected to a motor shaft of the driving motor, and the main driving inner sub-part 412 is inserted into the other end of the main driving outer sub-part 411, that is, an inner sub-part hole 413 is formed in the face of the other end of the main driving outer sub-part 411, a protruding inner sub-part insert 414 is disposed at one end of the main driving inner sub-part 412, and the size and shape of the inner sub-part hole 413 basically match the size and shape of the inner sub-part insert 414. During use, the main driving outer sub-part 411 drives the main driving inner sub-part 412 to rotate synchronously and coaxially, and the rotating main driving inner sub-part 412 drives the intermediate driving member 420 to rotate. To ensure that the main driving outer sub-part 411 can better drive the main driving inner sub-part 412 to rotate synchronously and coaxially, both the cross-section of the inner sub-part hole 413 and the cross-section of the inner sub-part insert 414 are of a non-circular structure. In addition to that the main driving outer sub-part 411 can drive the main driving inner sub-part 412 to rotate synchronously and coaxially, the inner wall of the inner sub-part insert 414 can be smoothly connected to the inner wall of the inner sub-part hole 413 to reduce sharp corners. As shown in FIG. 6, the boundary of the cross-section 415 of the inner sub-part hole 413 and the inner sub-part insert 414 not only comprises a pair of straight sections 4151, but also comprises a pair of arc sections 4152, wherein one identical ends of the pair of straight sections 4151 are connected through one arc section 4152, and the other identical ends of the pair of straight sections 4151 are connected through the other arc section 4152. Moreover, in order to improve the connection stability of the main driving outer sub-part 411 and the main driving inner sub-part 412 inserted into the main driving outer sub-part 411, a connecting shaft 416 is added and is inserted into shaft connecting holes 417 in the main driving outer sub-part 411 and the main driving inner sub-part 412.

The intermediate driving member 420 is connected to the main driving member 410, and is driven by the main driving member 410 to rotate during use.

The swing assembly is disposed between the main driving member 410 and the intermediate driving member 420. During use, the main driving member 410 drives the swing assembly to swing from a preset first swing angle to a preset second swing angle, or swing from the preset second swing angle to the preset first swing angle, and the difference between the first swing angle and the second swing angle is less than 180°, such as 150° or 120°. As one example, the difference between the first swing angle and the second swing angle is at least greater than or equal to 90°. The intermediate driving member 420 is disposed on the swing assembly, and when the swing assembly swings, the intermediate driving member 420 swings synchronously with the swing assembly.

The operating principle of the swing assembly is as follows: when the main driving member 410 drives the swing assembly to swing from the preset first swing angle to the preset second swing angle, the intermediate driving member 420 rotates to be separated from the first driven member 350 and then be connected to the second driven member 360 and drive the second driven member 360 to rotate. When the main driving member 410 drives the swing assembly to swing from the preset second swing angle to the preset first swing angle, the intermediate driving member 420 rotates to be separated from the second driven member 360 and then be connected to the first driven member 350 and drive the first driven member 350 to rotate.

As shown in FIG. 5 and FIG. 7, as one specific embodiment of the swing assembly, the swing assembly comprises a magnetic part 441 and a first connecting plate 442, wherein the magnetic part 441 is disposed on the main driving member 410, and the first connecting plate 442 is connected to the main driving member 410 and the intermediate driving member 420. The first connecting plate 442 is connected to the main driving member 410 and the intermediate driving member 420, that is, the main driving member 410 is inserted into a first mounting through hole 444 formed in the first connecting plate 442, so that when rotating, the main driving member 410 drives the first connecting plate 442 to rotate by means of the attractive force of the magnetic part 441 on the main driving member 410 rather than directly driving the first connecting plate 442 to rotate synchronously, so as to enable the first connecting plate 442 to swing to the first swing angle or the second swing angle. The intermediate driving member 420 is rotatably disposed in a second mounting through hole 445 formed in the first connecting plate 442, so that when the intermediate driving member 420 is driven by the main driving member 410 to rotate, the first connecting plate 442 does not rotate synchronously with the intermediate driving member 420.

It should be noted that the magnetic part 441 attracts the first connecting plate 442 by means of the mutual attraction of two opposite poles (pole S and pole N), and is generally made from a magnetic material such as (ferrite magnetic material, ferro magnetic material, ferrimagnetic material, or permanent magnet material).

As one example of the swing assembly, as shown in FIG. 5 and FIG. 7, the swing assembly further comprises a second connecting plate 443. The second connecting plate 443 is rotatably connected to the main driving member 410 and the intermediate driving member 420, that is, when the main driving member 410 and the intermediate driving member 420 rotate, the second connecting plate 443 swings synchronously with the first connecting plate 442 rather than rotating synchronously with the main driving member 410 and the intermediate driving member 420. Wherein, the intermediate driving member 420 is disposed between the first connecting plate 442 and the second connecting plate 443. Through the second connecting plate 443, both ends of the intermediate driving member 420 can be supported, thus improving the stability of the intermediate driving member 420 during rotation; and particularly when the intermediate driving member 420 drives the first driven member 350 or the second driven member 360 to rotate, the stability during rotation will be worse if one end of the intermediate driving member 420 is not supported. Similarly, the main driving member 410 is coaxially connected to the first connecting plate 442 and the second connecting plate 443, which can improve the stability when the swing assembly swings.

In addition, as shown in FIG. 5 and FIG. 7, when the main driving member 410 is formed by the main driving outer sub-part 411 and the main driving inner sub-part 412 inserted in and connected to the main driving outer sub-part 411, the first connecting plate 442 and the second connecting plate 443 are disposed on an upper portion and a lower portion of the main driving inner sub-part 412 respectively, and the magnetic part 441 is disposed on a side face, adjacent to the main driving inner sub-part 412, of the main driving outer sub-part 411. In order to reduce the probability of movement of the magnetic part 441 during rotation of the main driving outer sub-part 411, a magnetic part locating groove 418 is formed in the side face, adjacent to the main driving inner sub-part 412, of the main driving outer sub-part 411, such that one end of the magnetic part 441 can be located in the magnetic part locating groove 418, and the other end of the magnetic part 441 can stretch out of the magnetic part locating groove 418 to attract the first connecting plate 442 located on the main driving inner sub-part 412.

As one example of the swing assembly, as shown in FIG. 5 and FIG. 7, to improve the attractive force of the magnetic part 441 to the first connecting plate 442, the number of the magnetic parts 441 is increased. During installation, the magnetic parts 441 are regularly disposed on the main driving member 410 at intervals (in case of an integrated structure), or the face of the side, corresponding to the first connecting plate 442, of the main driving outer sub-part 411 (in case of a separable structure).

As one example of the swing assembly, when the magnetic part 441 attracts the first connecting plate 442, the magnetic part 441 does not contact the first connecting plate 442. In this way, after the first connecting plate 442 is attracted by the magnetic part 441 to swing to the first swing angle or the second swing angle, the magnetic part 441 can get rid of the first connecting plate 442 with a small force when continuing to rotate with the main driving member 410, such that the resistance of the main driving member 410 (in case of an integrated structure) or the main driving outer sub-part 411 (in case of a separable structure) during rotation is reduced.

As one example of the swing assembly, the first connecting plate 442 is made of a damping material, such that the first connecting plate 442 can be better adhered to the main driving member 410 (in case of an integrated structure) or the main driving inner sub-part 412 (in the case of a separable structure).

The pair of stoppers are disposed at a position corresponding to the first swing angle and a position corresponding to the second swing angle respectively, and are used for preventing the swing assembly from continuing to rotate in the rotation direction of the main driving member 410 when the swing assembly swings to the first swing angle or the second swing angle.

As an example of the stoppers, as shown in FIG. 5 and FIG. 7 which illustrate one specific implementation of the pair of stoppers, the pair of stoppers form a splay stop block 431. In the case where the swing assembly only comprises the first connecting plate 442, the stop block 431 is used to stop the first connecting plate 442 merely, and does not contact the intermediate driving member 420 or the main driving member 410 (at least the joint of the intermediate driving member 420 and the main driving member 410). In the case where the swing assembly comprises both the first connecting plate 442 and the second connecting plate 443, the stop block 431 stops either the first connecting plate 442 or the second connecting plate 443, and does not necessarily cover both the first connecting plate 442 and the second connecting plate 443.

As one example of the clutch device, as shown in FIG. 5 and FIG. 7, the sum of the radial length of the main driving member 410 and the radial length of the intermediate driving member 420 is less than the radial length of the first driven member 350 and the radial length of the second driven member 360. In this way, the clutch device can be arranged in a narrow space, and the space required for installing the clutch device is saved.

As one example of the clutch device, as shown in FIG. 5 and FIG. 7, the clutch device further comprises a pair of enclosure members 450, and the main driving member 410, the intermediate driving member 420 and the swing assembly are enclosed by the pair of enclosure members 450, the first driven member 350 and the second driven member 360.

In the claims, the term "comprise" shall not exclusive of other units or steps, and the term "a" or "one" shall not exclusive of multiple. In the claims, ordinal numerals used for qualifying elements in the claims such as "first" and "second" do not indicate the priority or order of one element with respect to the other element in the claims, or the time sequence for performing actions, and is merely for the purpose of distinguishing one element from another element in the claims. Although some specific technical features are recorded in different dependent claims, it does not mean that these specific technical features cannot be combined for use. All aspects of the invention can be used separately, in combination, or by means of various arrangements not specifically discussed in the above embodiments, and the application of these aspects should not be limited to the details and arrangements of the components described above or in the drawings. For example, multiple aspects described in one embodiment may be combined with multiple aspects described in other embodiments. Steps, functions or features of multiple modules or units may be implemented or fulfilled by one module or unit. The steps of the method disclosed in the invention are not limited to any specific execution sequence, and all or part of these steps may be implemented in other sequences. Any reference signs in the claims should not be construed as limitations of the scope of the claims.

Although the invention has been described with reference to accompanying drawings and embodiments, such descriptions and explanations should be construed as descriptive or illustrative rather than being restrictive. Those ordinarily skilled in the art would appreciate that various improvements, additions and substitutions can be made without departing from the scope and spirit of the appended claims of the invention.

What is claimed is:

1. An electric guide rail type conveying system, comprising:
    a driving motor;
    a guide rail, a passage which penetrates through the guide rail in a lengthwise direction being disposed in the guide rail, and an opening communicated with the passage being formed in one side of the guide rail in the lengthwise direction;
    a main transmission case and an auxiliary transmission case correspondingly disposed at two ends of the guide rail, the driving motor being disposed on the main transmission case;
    a conveying member disposed on a structure formed by the main transmission case, the guide rail and the auxiliary transmission case; and
    a moving trolley disposed on the conveying member, moving on the guide rail, and used for carrying external goods;
    wherein, the auxiliary transmission case comprises:
    an auxiliary transmission case body; and a guide wheel disposed on the auxiliary transmission case body, one portion of the conveying member being movably disposed on the guide wheel during use, and a moving direction of the conveying member being changed by the guide wheel;

wherein, the main transmission case comprises:

a main transmission case body;

a first rotating member rotatably disposed on the main transmission case body, one end of the conveying member being elastically deformably wound on the first rotating member in a first winding direction;

a second rotating member rotatably disposed on the main transmission case body and spaced apart from the first rotating member, an axial direction of the second rotating member being basically parallel with an axial direction of the first rotating member, the other end of the conveying member being elastically deformably wound on the second rotating member in a second winding direction opposite to the first winding direction; and a balance rotating member rotatably disposed on the main transmission case body and rotatably connected to the first rotating member and the second rotating member, such that when one of the first rotating member and the second rotating member rotates, the other one of the first rotating member and the second rotating member is driven to rotate in a same rotation direction through the balance rotating member;

wherein, before installation, the conveying member is basically wound on the first rotating member and the second rotating member;

wherein, when a relative outer portion of the conveying member wound on the first rotating member is separated from the first rotating member, a first elastic resilience opposite to the first winding direction is generated; with the increase of a portion, separated from the first rotating member, of the conveying member, the first elastic resilience will increase; otherwise, the first elastic resilience will decrease;

wherein, when a relative outer portion of the conveying member wound on the second rotating member is separated from the second rotating member, a second elastic resilience opposite to the second winding direction is generated; with the increase of a portion, separated from the second rotating member, of the conveying member, the second elastic resilience will increase; otherwise, the second elastic resilience will decrease;

wherein, when the driving motor drives the first rotating member to rotate, a portion, not wound on the first rotating member, of the conveying member will be wound on the first rotating member in the first winding direction, a portion, wound on the first rotating member, of the conveying member will be driven by the first rotating member to be tensioned, the relative outer portion, wound on the second rotating member, of the conveying member will be driven by the balance rotating member to be separated from the second rotating member in a direction opposite to the second winding direction, and a portion, wound on the second rotating member, of the conveying member will be driven by the second rotating member to be loosened, such that the second elastic resilience is opposite to the first elastic resilience in direction and is basically identical with the first elastic resilience in magnitude;

wherein, when the driving motor drives the second rotating member to rotate, a portion, not wound on the second rotating member, of the conveying member will be wound on the second rotating member in the second winding direction, a portion, wound on the second rotating member, of the conveying member will be driven by the second rotating member to be tensioned, the relative outer portion, wound on the first rotating member, of the conveying member will be driven by the balance rotating member to be separated from the first rotating member in a direction opposite to the first winding direction, and a portion, wound on the first rotating member, of the conveying member will be driven by the first rotating member to be loosened, such that the first elastic resilience is opposite to the second elastic resilience in direction and is basically identical with the second elastic resilience in magnitude.

2. The electric guide rail type conveying system according to claim 1, wherein:

the first rotating member comprises:

a first rotating shaft; and a first rotating wheel coaxial with the first rotating shaft, the first rotating shaft and the first rotating wheel rotating synchronously during use;

the second rotating member comprises:

a second rotating shaft; and a second rotating wheel coaxial with the second rotating shaft, the second rotating shaft and the second rotating wheel rotating synchronously during use.

3. The electric guide rail type conveying system according to claim 2, wherein:

the balance rotating member comprises:

a balance rotating shaft; and a balance rotating wheel coaxial with the balance rotating shaft, the balance rotating shaft and the balance rotating wheel rotating synchronously during use;

wherein, the first rotating wheel, the second rotating wheel and the balance rotating wheel are all of a gear structure, and the balance rotating wheel is engaged with the second rotating wheel.

4. The electric guide rail type conveying system according to claim 3, wherein:

a shape and size of the first rotating wheel are basically the same as those of the second rotating wheel and those of the balance rotating wheel, and a number, size and shape of wheel teeth of the first rotating wheel are basically the same as those of wheel teeth of the second rotating wheel and those of wheel teeth of the balance rotating wheel.

5. The electric guide rail type conveying system according to claim 2, wherein:

the balance rotating member is a circular conveyer belt or a circular conveyer chain, the first rotating wheel and the second rotating wheel are both of a belt wheel or chain wheel structure, the circular conveyer belt or the circular conveyer chain is installed on the first rotating wheel and the second rotating wheel, and during use, the first rotating wheel or the second rotating wheel rotates to drive the second rotating wheel or the first rotating wheel to rotate in a same direction through the circular conveyer belt or the circular conveyer chain.

6. The electric guide rail type conveying system according to claim 1, wherein:

a height of a first conveying member winding area for storing the conveying member wound on the first rotating member and a height of a second conveying member winding area for storing the conveying member wound on the second rotating member basically match a width of the conveying member.

7. An electrical guide rail type conveying system, comprising:
a driving motor;
a guide rail, a passage which penetrates through the guide rail in a lengthwise direction being disposed in the guide rail, and an opening communicated with the passage being formed in one side of the guide rail in the lengthwise direction;
a main transmission case and an auxiliary transmission case correspondingly disposed at two ends of the guide rail, the driving motor being disposed on the main transmission case;
a conveying member disposed on a structure formed by the main transmission case, the guide rail and the auxiliary transmission case; and
a moving trolley disposed on the conveying member, moving on the guide rail, and used for carrying external goods;
wherein, the auxiliary transmission case comprises:
an auxiliary transmission case body; and
a guide wheel disposed on the auxiliary transmission case body, one portion of the conveying member being movably disposed on the guide wheel during use, and a moving direction of the conveying member being changed by the guide wheel;
wherein, the main transmission case comprises:
a main transmission case body;
a first rotating member rotatably disposed on the main transmission case body, one end of the conveying member being elastically deformably wound on the first rotating member in a winding direction; and
a second rotating member rotatably disposed on the main transmission case body and spaced apart from the first rotating member, an axial direction of the first rotating member being basically parallel to an axial direction of the first rotating member, and the other end of the conveying member being elastically deformably wound on the second rotating member in the winding direction;
wherein, before installation, the conveying member is basically wound on the first rotating member and the second rotating member;
wherein, when a relative outer portion of the conveying member wound on the first rotating member is separated from the first rotating member, a first elastic resilience opposite to the winding direction is generated; with the increase of a portion, separated from the first rotating member, of the conveying member, the first elastic resilience will increase; otherwise, the first elastic resilience will decrease;
wherein, when a relative outer portion of the conveying member wound on the second rotating member is separated from the second rotating member, a second elastic resilience opposite to the winding direction is generated; with the increase of a portion, separated from the second rotating member, of the conveying member, the second elastic resilience will increase; otherwise, the second elastic resilience will decrease;
wherein, the first rotating member comprises:
a first rotating shaft; and
a first rotating wheel coaxial with the first rotating shaft, the first rotating shaft and the first rotating wheel rotating synchronously during use;
wherein, the second rotating member comprises:
a second rotating shaft; and
a second rotating wheel coaxial with the second rotating shaft, the second rotating shaft and the second rotating wheel rotating synchronously during use;
wherein, the first rotating wheel and the second rotating wheel are both of a gear structure, the first rotating wheel is engaged with the second rotating wheel, a size and shape of the first rotating wheel are basically the same as those of the second rotating wheel, and a number, size and shape of wheel teeth of the first rotating wheel are basically the same as those of wheel teeth of the second rotating wheel;
wherein, when the driving motor drives the first rotating member to rotate, a portion, not wound on the first rotating member, of the conveying member will be wound on the first rotating member in the winding direction, a portion, wound on the first rotating member, of the conveying member will be driven by the first rotating member to be tensioned, the relative outer portion, wound on the second rotating member, of the conveying member will be driven by the first rotating member to be separated from the second rotating member in a direction opposite to the winding direction, and a portion, wound on the second rotating member, of the conveying member will be driven by the second rotating member to be loosened, such that the second elastic resilience is opposite to the first elastic resilience in direction and is basically identical with the first elastic resilience in magnitude;
wherein, when the driving motor drives the second rotating member to rotate, a portion, not wound on the second rotating member, of the conveying member will be wound on the second rotating member in the winding direction, a portion, wound on the second rotating member, of the conveying member will be driven by the second rotating member to be tensioned, the relative outer portion, wound on the first rotating member, of the conveying member will be driven by the second rotating member to be separated from the first rotating member in a direction opposite to the winding direction, and a portion, wound on the first rotating member, of the conveying member will be driven by the first rotating member to be loosened, such that the first elastic resilience is opposite to the second elastic resilience in direction and is basically identical with the second elastic resilience in magnitude.

8. An electric guide rail type conveying system, comprising
a driving motor;
a guide rail, a passage which penetrates through the guide rail in a lengthwise direction being disposed in the guide rail, and an opening communicated with the passage being formed in one side of the guide rail in the lengthwise direction;
a main transmission case and an auxiliary transmission case correspondingly disposed at two ends of the guide rail, the driving motor being disposed on the main transmission case;
a conveying member disposed on a structure formed by the main transmission case, the guide rail and the auxiliary transmission case; and
a moving trolley disposed on the conveying member, moving on the guide rail, and used for carrying external goods;
wherein, the auxiliary transmission case comprises:
an auxiliary transmission case body; and
a guide wheel disposed on the auxiliary transmission case body, one portion of the conveying member being movably disposed on the guide wheel during use, and a moving direction of the conveying member being changed by the guide wheel;

wherein, the main transmission case comprises:

a main transmission case body;

a first rotating member rotatably disposed on the main transmission case body, one end of the conveying member being elastically deformably wound on the first rotating member in a winding direction;

a second rotating member rotatably disposed on the main transmission case body and spaced apart from the first rotating member, an axial direction of the first rotating member being basically parallel to an axial direction of the first rotating member, and the other end of the conveying member being elastically deformably wound on the second rotating member in the winding direction; and a balance rotating member rotatably disposed on the main transmission case body and rotatably connected to the first rotating member and the second rotating member, such that when one of the first rotating member and the second rotating member rotates, the other one of the first rotating member and the second rotating member will be driven to rotate in an opposite direction;

wherein, before installation, the conveying member is basically wound on the first rotating member and the second rotating member;

wherein, when a relative outer portion of the conveying member wound on the first rotating member is separated from the first rotating member, a first elastic resilience opposite to the winding direction is generated; with the increase of a portion, separated from the first rotating member, of the conveying member, the first elastic resilience will increase; otherwise, the first elastic resilience will decrease;

wherein, when a relative outer portion of the conveying member wound on the second rotating member is separated from the second rotating member, a second elastic resilience opposite to the winding direction is generated; with the increase of a portion, separated from the second rotating member, of the conveying member, the second elastic resilience will increase; otherwise, the second elastic resilience will decrease;

wherein, when the driving motor drives the first rotating member to rotate, a portion, not wound on the first rotating member, of the conveying member will be wound on the first rotating member in the winding direction, a portion, wound on the first rotating member, of the conveying member will be driven by the first rotating member to be tensioned, the relative outer portion, wound on the second rotating member, of the conveying member will be driven by the balance rotating member to be separated from the second rotating member in a direction opposite to the winding direction, and a portion, wound on the second rotating member, of the conveying member will be driven by the second rotating member to be loosened, such that the second elastic resilience is opposite to the first elastic resilience in direction and is basically identical with the first elastic resilience in magnitude;

wherein, when the driving motor drives the second rotating member to rotate, a portion, not wound on the second rotating member, of the conveying member will be wound on the second rotating member in the winding direction, a portion, wound on the second rotating member, of the conveying member will be driven by the second rotating member to be tensioned, the relative outer portion, wound on the first rotating member, of the conveying member is driven by the balance rotating member to be separated from the first rotating member in the direction opposite to the winding direction, and a portion, wound on the first rotating member, of the conveying member will be driven by the first rotating member to be loosened, such that the first elastic resilience is opposite to the second elastic resilience in direction and is basically identical with the second elastic resilience in magnitude.

9. The electric guide rail type conveying system according to claim 8, wherein, the first rotating member comprises:

a first rotating shaft; and a first rotating wheel coaxial with the first rotating shaft, the first rotating shaft and the first rotating wheel rotating synchronously during use;

wherein, the second rotating member comprises:

a second rotating shaft; and a second rotating wheel coaxial with the second rotating shaft, the second rotating shaft and the second rotating wheel rotating synchronously during use;

wherein, one of the first rotating wheel and the second rotating wheel is of a gear structure, and the other one of the first rotating wheel and the second rotating wheel is of a belt wheel or chain wheel structure;

wherein, the balance rotating member comprises:

a balance rotating shaft;

at least two balance rotating wheels coaxial with the balance rotating shaft, the balance rotating shaft and the balance rotating wheels rotating synchronously during use, the at least two said balance rotating wheels being sequentially and coaxially arranged in an axial direction of the balance rotating shaft and being parallel to and spaced apart from each other, at least one of the balance rotating wheels being of a gear structure, and at least the other one of the balance rotating wheels being of a belt wheel or chain wheel structure; and a circular conveyer belt or a circular conveyer chain disposed on either the first rotating wheel or the second rotating wheel of the belt wheel or chain wheel structure, and one said balance rotating wheel of the belt wheel or chain wheel structure;

wherein, either the first rotating wheel or the second rotating wheel of the gear structure is engaged and connected with one said balance rotating wheel of the gear structure;

wherein, when the driving motor drives one of the first rotating member and the second rotating member to rotate, the other one of the first rotating wheel and the second rotating wheel will be driven to rotate reversely through the balance rotating member.

10. The electric guide rail type conveying system according to claim 9, wherein:

a shape and size of either first rotating wheel or the second rotating wheel of the gear structure are basically the same as those of one said balance rotating wheel, and a number, size and shape of wheel teeth of either first rotating wheel or the second rotating wheel of the gear structure are basically the same as those of wheel teeth of one said balance rotating wheel.

* * * * *